(No Model.)
H. A. PORTER.
PNEUMATIC TIRE FASTENER.
No. 592,480. Patented Oct. 26, 1897.
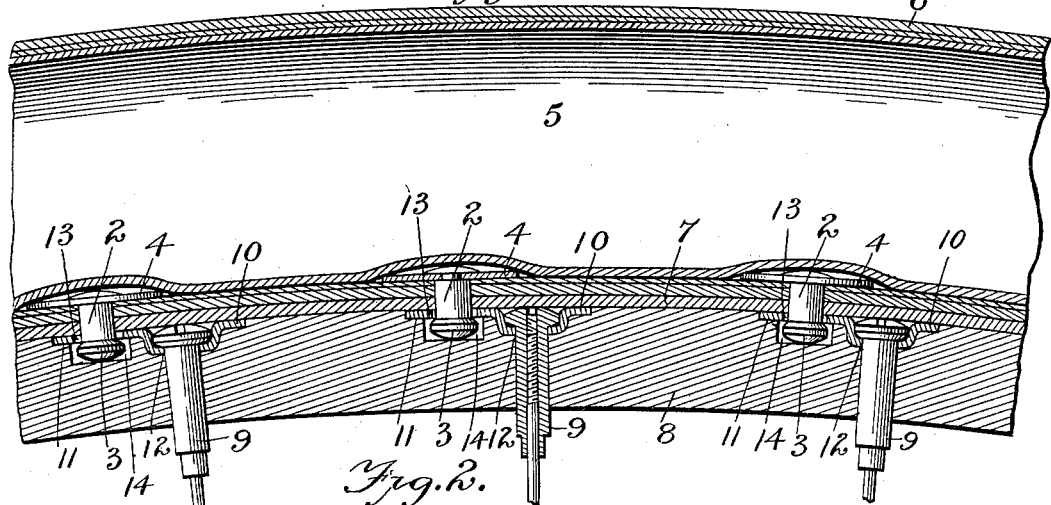
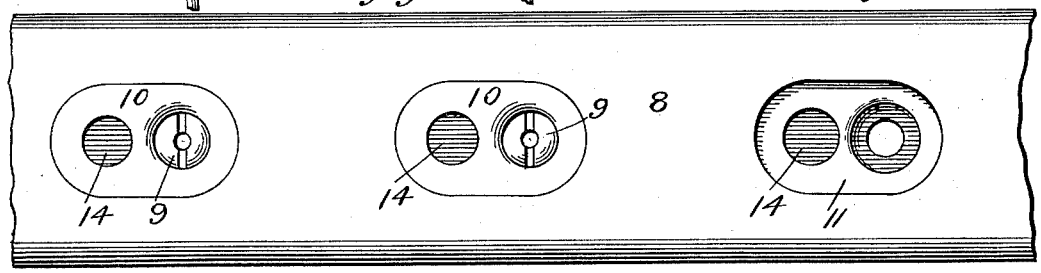
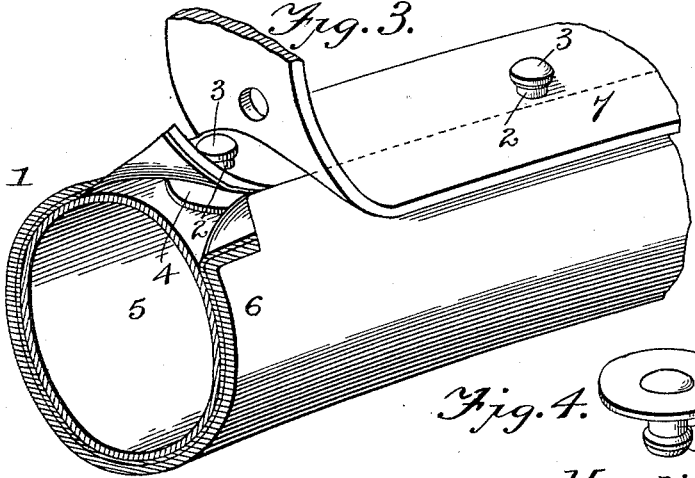
Witnesses
Edwin G. McKee
V. B. Hillyard.
Inventor
Horatio A. Porter
By his Attorneys,
C. A. Snow & Co.

UNITED STATES PATENT OFFICE.

HORATIO A. PORTER, OF HOLYOKE, MASSACHUSETTS, ASSIGNOR OF ONE-HALF TO T. B. FLANDERS, OF SAME PLACE.

PNEUMATIC-TIRE FASTENER.

SPECIFICATION forming part of Letters Patent No. 592,480, dated October 26, 1897.

Application filed March 31, 1897. Serial No. 630,128. (No model.)

*To all whom it may concern:*

Be it known that I, HORATIO A. PORTER, a citizen of the United States, residing at Holyoke, in the county of Hampden and State of Massachusetts, have invented a new and useful Pneumatic-Tire Fastener, of which the following is a specification.

This invention relates to means for securing hose-pipe, pneumatic or similarly-formed tires to vehicle-rims, and aims to provide a securing means which will prevent the creeping of the tire upon the rim and the accidental disengagement therefrom.

The invention is especially adapted for pneumatic tires used in connection with wooden rims, the spoke-nipples and the spokes being taken advantage of to retain the plates in position upon the rim which coöperate with headed pins or studs applied to the tire, said pins and plates constituting the complementary parts of the fastening.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a central longitudinal section of a portion of a vehicle rim and tire, showing the application of the invention. Fig. 2 is a top plan view of a portion of a rim. Fig. 3 is a detail perspective view of a portion of the tire, showing parts drawn back to expose a headed stud. Fig. 4 is a detail view in perspective of a headed stud.

Corresponding and like parts are referred to in the following description and indicated in the several views of the drawings by the same reference-characters.

The tire 1 is of the ordinary pneumatic type, and is provided at intervals in its length on the inner side with studs or pins 2, headed at their outer ends, as shown at 3, and having plates 4 applied to their inner ends, said plates being preferably of circular outline and secured to the inner ends of the studs or pins by riveting or upsetting them. The plates 4 are secured between layers of the tire, and the studs or pins project through openings formed in the outer layers. These studs or pins are placed in position when constructing or manufacturing the tire, and by having the plates 4 coming between layers the studs are securely held in place and the plates provide sufficient surface to prevent the studs or pins from passing through the inner layers of the tire. As shown, the tire is composed of an inner tube 5, of textile or seamless webbing, and an outer jacket 6, consisting of a combination of cloth and rubber cemented together, said jacket being separable longitudinally on a line corresponding with a medial line of the rim, the joint being protected by a strip 7, of rubber, cemented to the jacket upon opposite sides of the line of separation.

The rim 8 may be of metal and of desired pattern, but is preferably of wood, and is supplied with spoke-nipples 9 for connection therewith of the outer ends of the spokes in the usual way. Plates 10 are applied to the outer side of the rim and are seated in recesses 11, so as to come flush therewith, and are retained in place by means of the spoke-nipples, which pass through openings 12, formed therein. These plates 10 are oblong and extend lengthwise of the rim, and the openings 12 are provided in one end thereof, and other openings 13 are formed in the opposite end of the plates and are of a size to snugly receive the heads 3 of the studs or pins 2. Mortises or cavities 14 are formed in the rim opposite the openings 13 to receive the headed ends of the studs or pins, and are slightly larger than the openings 13, thereby providing for the heads 3 to engage with the inner marginal portion of the plates bordering upon the openings 13, whereby the tire is securely held in place. The openings 12 are depressed to receive the headed ends of the spoke-nipples, so as to permit them to come flush with the outer side of the rim, whereby the tire will fit snugly against the rim at all points in its length. The number of plates 10 and studs or pins 2 will depend upon the size and dimensions of the wheel and will vary as may be found necessary to secure the best possible results, it not being necessary to provide a plate for each spoke-nipple. The headed studs or pins and the plates 10 will correspond in position, and when the tire is in place it will be held fast by the headed portions of the studs passing through the openings 13 and into the mortises or cavities 14, as herein set forth. The snug fit between the heads 3 and the openings 13 insures a secure fastening being obtained, as it is essential that these parts be brought into exact register in order to admit of the tire being removed.

Having thus described the invention, what is claimed as new is—

1. In combination, a tire having headed studs or pins at intervals in its length, a rim, plates separate and independent of the rim and placed against the outer side thereof and having pairs of openings, one set of openings receiving the headed pins or studs, and spoke-nipples passing through the other set of openings and through corresponding openings in the rim and serving in conjunction with the spokes as means for securing the plates in position on the rim, and the plates in turn providing washers for the heads of the spoke-nipples to prevent them from pulling through the rim, substantially as set forth.

2. In combination, a tire, pins or studs secured to the tire and having their projecting ends headed, a rim having recesses at intervals in its outer side, plates seated in the said recesses and coming flush with the outer side of the rim and having pairs of openings, one set of openings receiving the headed ends of the said pins or studs, and spoke-nipples passing through the other set of openings and through corresponding openings in the rim, and serving in conjunction with the spokes as means for securing the plates in position on the rim and the plates in turn providing washers for the heads of the spoke-nipples to prevent them from pulling through the rim, substantially as specified.

In testimony that I claim the foregoing as my own I have hereto affixed my signature in the presence of two witnesses.

HORATIO A. PORTER.

Witnesses:
T. B. FLANDERS,
FRED. F. PARTRIDGE.